United States Patent
Shuster

(10) Patent No.: US 7,844,141 B2
(45) Date of Patent: Nov. 30, 2010

(54) METHOD AND APPARATUS FOR PHOTOGRAPH FINDING

(76) Inventor: Gary Stephen Shuster, 486 E. Rusty Harbor Dr., Fresno, CA (US) 93720

( * ) Notice: Subject to any disclaimer, the term of this patent is extended or adjusted under 35 U.S.C. 154(b) by 22 days.

(21) Appl. No.: 12/325,589

(22) Filed: Dec. 1, 2008

(65) Prior Publication Data

US 2009/0083236 A1    Mar. 26, 2009

Related U.S. Application Data

(63) Continuation of application No. 11/056,699, filed on Feb. 10, 2005, now Pat. No. 7,460,737.

(60) Provisional application No. 60/544,570, filed on Feb. 12, 2004.

(51) Int. Cl.
*G06K 9/60* (2006.01)

(52) U.S. Cl. .............. 382/305; 382/209; 382/219; 382/307; 707/3; 707/102

(58) Field of Classification Search ............ 382/209, 382/218, 219, 305, 307
See application file for complete search history.

(56) References Cited

U.S. PATENT DOCUMENTS

| | | | |
|---|---|---|---|
| 5,848,410 A | | 12/1998 | Walls et al. |
| 5,926,812 A * | | 7/1999 | Hilsenrath et al. ............ 707/5 |
| 6,094,649 A | | 7/2000 | Bowen et al. |
| 6,353,840 B2 * | | 3/2002 | Saito et al. ................... 715/202 |
| 6,397,213 B1 | | 5/2002 | Cullen et al. |
| 6,421,675 B1 | | 7/2002 | Ryan et al. |
| 6,564,214 B1 | | 5/2003 | Bhide |
| 6,654,758 B1 | | 11/2003 | Teague |
| 6,658,408 B2 * | | 12/2003 | Yano et al. ..................... 707/3 |
| 6,772,150 B1 | | 8/2004 | Whitman et al. |
| 7,110,996 B2 | | 9/2006 | Kawamura |
| 7,174,332 B2 * | | 2/2007 | Baxter et al. ..................... 1/1 |
| 7,209,653 B2 * | | 4/2007 | Umeda ...................... 396/661 |
| 7,266,544 B1 * | | 9/2007 | Dodge et al. ................... 707/3 |
| 7,266,554 B2 * | | 9/2007 | Kayahara et al. .................. 1/1 |

* cited by examiner

*Primary Examiner*—Yosef Kassa
(74) *Attorney, Agent, or Firm*—Knobbe, Martens, Olson & Bear LLP

(57) ABSTRACT

Digital image data including discrete photographic images of a variety of different subjects, times, and so forth, are collected and analyzed to identify specific features in the photographs. In an embodiment of the invention, distinctive markers are distributed to aid in the identification of particular subject matter. Facial recognition may also be employed. The digital image data is maintained in a database and quarried in response to search requests. The search requests include criteria specifying any feature category or other identifying information, such as date, time, and location that each photograph was taken, associated with each photograph. Candidate images are provided for review by requesters, who may select desired images for purchase or downloading.

45 Claims, 2 Drawing Sheets

METHOD AND APPARATUS FOR PHOTOGRAPH FINDING

CROSS REFERENCE TO RELATED APPLICATIONS

This application is a continuation of U.S. application Ser. No. 11/056,699 filed Feb. 10, 2005, now U.S. Pat. No. 7,460,737, which claims priority pursuant to 35 U.S.C. §119(e) to U.S. Provisional Application No. 60/544,570, filed Feb. 12, 2004, which applications are specifically incorporated herein, in their entirety, by reference.

BACKGROUND OF THE INVENTION

Photography has transformed how people conceive of the world. Photographs allow people to see all sorts of things that are actually many miles away and/or years preceding. Photography lets people capture moments in time and preserve them for years to come.

Often people at a public place notice that a stranger has taken a photograph of which they would love to have a copy. Alternatively, after going somewhere, a person may bemoan the fact that he did not have a photograph of the event (in the present context, photograph also includes video, audio, or other representation).

A need exists, therefore, to provide a method and apparatus for identifying and connecting people with photographs they want. In addition, there is a need to provide a method and apparatus for characterizing errant photographs stored on computer databases that makes use of a variety of attributes to reliably characterize photographs in such a way as to reduce the amount of manual review necessary to identify and connect people with the photographs they want.

SUMMARY OF THE INVENTION

The present invention provides a method and apparatus that matches people with photographs in which they accidentally (or purposely) appear or with photographs of events they have attended.

Specifically, in one embodiment, a web site is created with a database backend. The database is seeded with information provided by (1) the photographer; (2) recovering metadata from the photograph; (3) reading devices such as a Global Positioning System (GPS) device; (4) referencing the account data of the photographer (i.e., account number, photographer's zip code or area code, etc.); (5) analyzing the photograph (i.e., computer recognizes eye color, optical character recognizes any text found in the photograph, recognizes the number of persons, the gender of persons, the hair color, the time of day by optical character recognizing any clocks in the photograph or analyzing the lighting conditions, the weather, etc.); (6) photograph quality information; and/or (7) any other information.

A user looking for a photograph would visit the web site and search for certain criteria. The user is then provided with a gallery of thumbnails that match the criteria. When the user identifies a photograph he wants to own, he can then download the full quality version, or order print(s). In a preferred implementation, the user is charged some amount of money that is split between the site owner and the photographer. Alternatively, the user may be charged in some other way, such as by viewing advertisements or by exchanging credits for downloads or by some other payment or a combination thereof.

A more complete understanding of the present invention will be afforded to those skilled in the art, as well as a realization of additional advantages and objects thereof, by a consideration of the following detailed description of the preferred embodiments.

DETAILED DESCRIPTION OF THE PREFERRED EMBODIMENTS

The present invention provides a method and apparatus that matches people with photographs in which they accidentally (or purposely) appear or with photographs of events they have attended.

Figure 1:
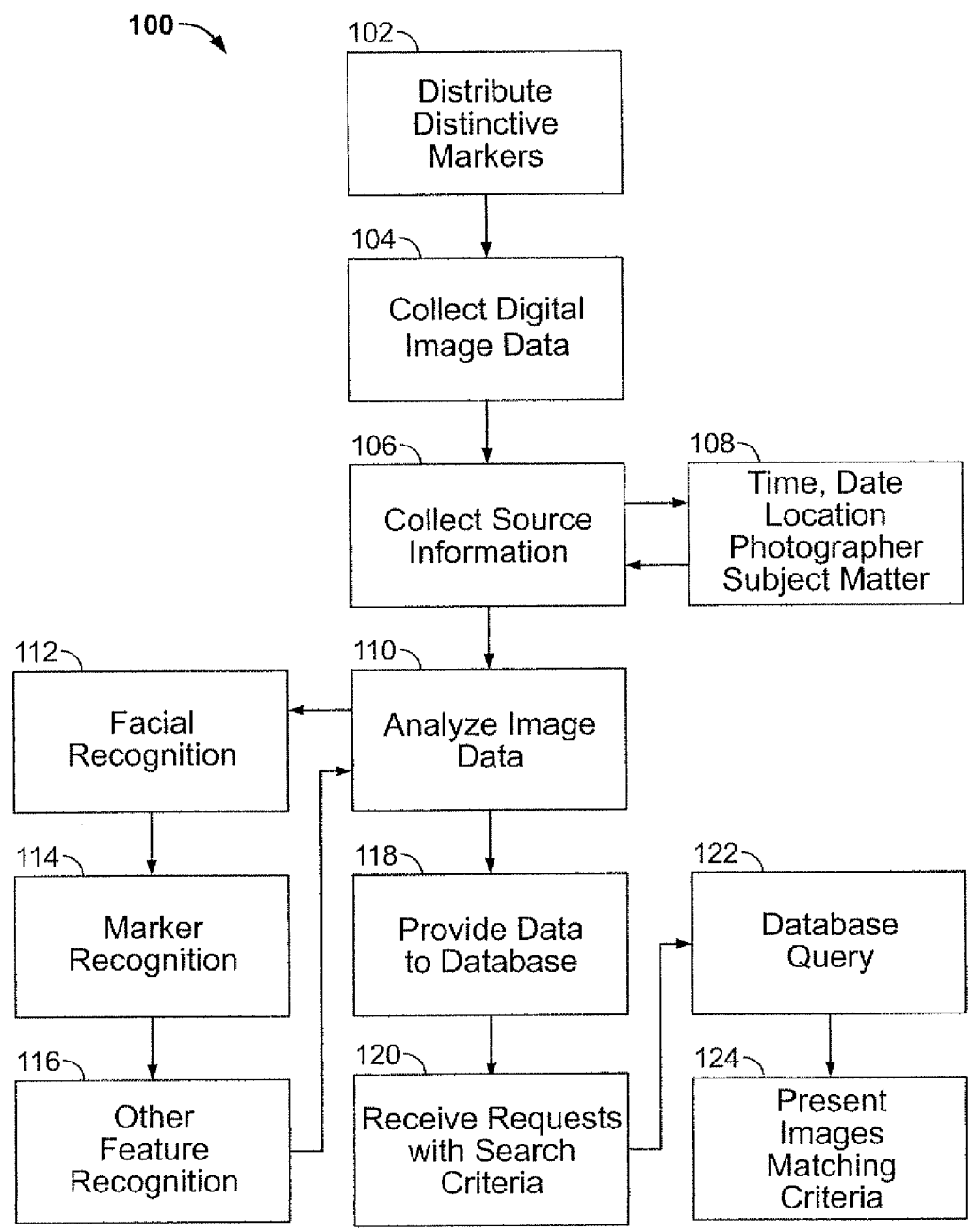
FIG. 1 is a flow diagram showing exemplary steps of a method according to the invention.

FIG. 1 illustrates exemplary steps of a method 100 according to the invention. At optional step 102, distinctive markers may be distributed to persons desiring to contribute photographic images to a database. The markers may comprise, for example, distinctive bins, badges, or stickers for placing on objects to be photographed. The markers should be designed so as to be easily recognized using automatic recognition algorithms, but should not be too conspicuous.

At step 104, image data is collected from a variety of sources. It may be desirable to accept material from as many sources as possible, to increase the number of images available for browsing. Optionally, images may be accepted from qualified sources only.

At step 104, source information regarding each photograph is collected. For example, at step 108, the image provider may be asked for information, such as the time and date of the photograph, the subject matter, location, photographer, etc. Image metadata may also be read to obtain such information. Other ways of associating images to identifying information may include, for example, reading devices such as a Global Positioning System (GPS) device attached to a camera or other image capture device, or by referencing account data of the image contributor (e.g., account number, photographer's zip code or area code, etc.).

At step 110, image data is analyzed to identify any characteristics that may be of interest to users. Such characteristics may include, for example, eye color, words and sentences, a number or gender of persons, the hair color, time of day, lighting conditions, and so forth. For further example, at step 112, a facial recognition program as known in the art may be used to analyze any faces appearing in the photos at a sufficiently high resolution. At step 114, the images may be analyzed for the presence of any known markers. And at step 116, other features and qualities of the image may be classified, for example, whether it is taken indoors or outdoors, whether it contains people, dogs, cats, or other animals, whether it contains automobiles, airplanes, or other objects, and so forth. At step 118, selected feature information and other source information is associated with each image and provided to any suitable relational database.

At step 120, requests specifying search criteria for photographic images are received. For example, a user looking for a photograph may visit a web site hosted by the system and fill out a search form specifying search criteria of interest. The criteria may include specific subject matter, times, dates, and locations. For example, "Disneyland AND Matterhorn AND blue eye AND child AND Jan. 1, 2004 AND morning" would search for a photograph or photographs taken at Disneyland's Matterhorn with a child who has blue eyes on the morning of Jan. 1, 2004.

At step 122, the image database is queried as known in the art, to identify images that at least partially match the search criteria. Such images may be presented, at step 124, to the user. For example, the user may be provided with a gallery of "thumbnail" (reduced-size) images generated from images that match the criteria. When the user identifies a photograph he wants to own, he can then download the full quality version, or order print(s). In a preferred implementation, the user is charged some amount of money that is split between the site owner and the photographer. Alternatively, the user may be charged in some other ways such as by viewing advertisements or by exchanging credits for downloads or by some other payment or a combination thereof. The price can be on a sliding scale depending on the quality of the photograph that the user downloads or the size or quality of the print. For example, a photograph may cost $1.00 for 1024×768 resolution or $2.00 for 1600×1200 resolution. Similarly, a print may cost $1.00 for 3×5 or $5 for 8×10. For downloads, an "upgrade" may be possible by charging the difference between the resolutions. An automated process may be used to reduce the number of pixels for purposes of having a lower quality version to sell.

In addition, a surcharge may be applied (even if no surcharge is required) for various enhancements to the photograph, such as "upconverting" to a higher resolution, eliminating red-eye, enhancing shadow, color, or brightness, etc.

Moreover, when a photographer takes photographs, he can be provided with printed cards bearing a Uniform Resource Locator (URL) and a unique code in order that the user would be able to enter into the web site to find the photograph or the series of photographs then being taken. The photographer can also distribute cards (the printed cards bearing the URL and the unique code or any other cards known to those skilled in the art) to people whom he photographs, whether intentionally or inadvertently. The photographer can further advertise the same (e.g., the URL and the unique code) via a mark on his camera, a T-shirt, or other means.

Fixed-place cameras can also serve this function (e.g., the of photographer). For example, a camera set up at an intersection in Hollywood might take and upload one photograph every 10 seconds.

Photographers can also be given accounts and be allowed to upload photographs to the site. The database is populated during this process, although additional database information can be added later by web site users. In addition, the number of times the photograph has been purchased and/or viewed can be a part of the database.

In one embodiment, the method and apparatus of the present invention should be capable of face recognition. It should assign values to various factors (i.e., ratio of distance between pupils to distance to tip of nose, etc.). It would add this information to the database for uploaded photographs. A user can then upload a photograph of the target person and the system would then generate the same data from that photograph and use it to limit the possible search targets.

Figure 2:
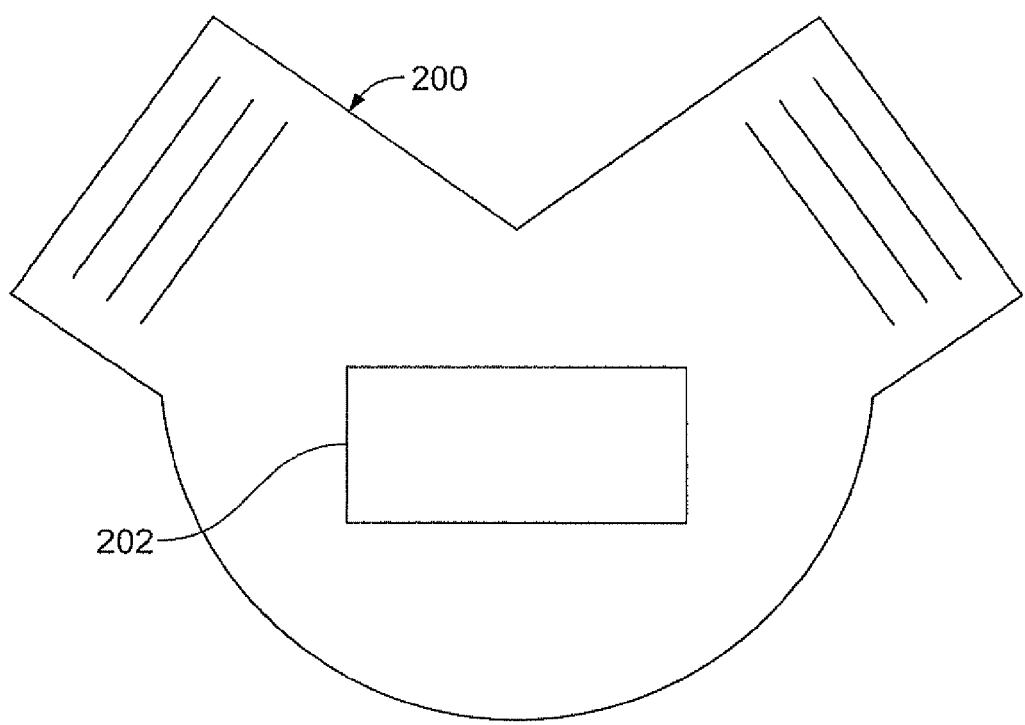
FIG. 2 is a diagram showing an exemplary distinctive marker for photographic data.

A provider of the present method and apparatus or a photographer can also hand out pins, clothing, or other materials that are marked in a way that allows a computer to later recognize them in a photograph. FIG. 2 shows an exemplary distinctive marker 200 having an optical code 202, such as a bar code. The marker may have a color combination, distinctive shape, lettering, bar code, or other optical pattern, or some combination of the foregoing, that is unique to the marker. The marker may be computer generated, for example, and produced using an end-user's laser or ink-jet printer. The marker may be associated with specific information, for example, a particular user account, photographer, subject matter type, person, event, or location. Users can later search for photographs containing an image of the marker.

Numerous distribution mechanisms exist whereby photographs may be distributed from a source over a wide area network, such as the Internet. In some cases, the photographs are distributed using a centralized server system (such as Napster 2.0, eBay, or from a web site). In other cases, the photographs are distributed using a decentralized system (such as Gnutella). In a preferred implementation, the photographs are distributed to a person using the centralized server system or using a central hub.

Embodiments of the present invention operate in accordance with at least one web-hosting mechanism and a plurality of user mechanisms communicating over a wide area network, such as the Internet. Specifically, a web-hosting mechanism includes a database, an interface application and a server, wherein the server is adapted to communicate with a plurality of user mechanisms over a wide area network. It should be appreciated that the mechanisms described can include, but are not limited to, personal computers, mainframe computers, personal digital assistances, wireless communication devices and all other physical and wireless connected network devices generally known to those skilled in the art. It should further be understood that the database depicted can include, but is not limited, to RAM, cache memory, flash memory, magnetic disks, optical disks, removable disks, SCSI disks, IDE hard drives, tape drives, and all other types of data storage devices (and combinations thereof, such as RAID devices) generally known to those skilled in the art. In addition, the mechanisms described above are for purposes of example only and the invention is not limited thereby.

Having thus described several embodiments for photograph finding, it should be apparent to those skilled in the art that certain advantages of the system have been achieved. It should also be appreciated that various modifications, adaptations, and alternative embodiments thereof may be made within the scope and spirit of the present invention. For example, in the context of the present invention a photograph can include video, audio, and/or other representation of how people conceive of the world. The invention is defined by the following claims.

What is claimed is:

1. A computer-implemented method, comprising:
    collecting digital image data comprising a plurality of discrete photographic images in digital form;
    collecting source information for each of the plurality of discrete photographic images;
    analyzing the digital image data to assign descriptions of objects appearing in each of the plurality of discrete photographic images;
    providing the digital image data for storage in a database in association with the source information and the assigned descriptions of objects appearing in the images;
    receiving requests to search the digital image data, wherein the requests comprise search criteria specifying descriptions of objects; and
    serving responses to the requests, the responses comprising identifiers for discrete photographic images in the database at least partially matching the search criteria.

2. The method of claim 1, wherein the source information comprises a time and a location that each of the discrete photographic images was first generated.

3. The method of claim 1, further comprising querying the database to identify the discrete photographic images at least partially matching the search criteria.

4. The method of claim 1, wherein analyzing the digital image data further comprises identifying facial characteristics of persons imaged in the digital image data.

5. The method of claim 1, further comprising electronically distributing a plurality of distinctive markers to contributors of the digital image data configured for printing on remote printers to provide distinctive marking signs for placing with subject matter to be photographed to create the digital image data.

6. The method of claim 5, wherein analyzing the digital image data further comprises identifying the distinctive markers when present in the digital image data.

7. The method of claim 5, further comprising searching the database using at least one object description included in the assigned descriptions specifying a selected one of the distinctive markers.

8. The method of claim 1, wherein further comprising searching the database using at least one object description included in the assigned descriptions specifying a personal identifying characteristic.

9. The method of claim 1, further comprising distributing a plurality of distinctive optical markers configured for placing with subject matter to be photographed to create the digital image data, each of the markers marked with optically encoded identifying data and having a predetermined appearance to facilitate computer recognition of the each of the markers in photographic image data.

10. The method of claim 9, further comprising recording predetermined appearances of each of the distinctive optical markers for use in analyzing the digital image data.

11. The method of claim 10, further comprising automatically analyzing the digital image data to detect any of the distinctive optical markers by comparison with the recorded predetermined appearances.

12. The method of claim 9, further comprising reading the identifying data encoded on images of the distinctive optical markers detected in the digital image data.

13. The method of claim 12, further comprising providing the digital image data for storage in the database in association with the identifying data encoded on the distinctive optical markers detected in the digital image data.

14. The method of claim 13, further comprising searching the database using at least one object description included in the assigned descriptions specifying the identifying data.

15. The method of claim 9, further comprising electronically transmitting the plurality of distinctive optical markers configured for printing on remote printers operated by remote clients.

16. A system, comprising:
a server having a memory holding an application, wherein the application is configured for:
collecting digital image data comprising a plurality of discrete photographic images in digital form;
collecting source information for each of the plurality of discrete photographic images;
analyzing the digital image data to assign descriptions of objects appearing in each of the plurality of discrete photographic images;
providing the digital image data for storage in a database in association with the source information and the assigned descriptions of objects appearing in the images;
receiving requests to search the digital image data, wherein the requests comprise search criteria specifying descriptions of objects; and
serving responses to the requests, the responses comprising identifiers for discrete photographic images in the database at least partially matching the search criteria.

17. The system of claim 16, wherein the application is further configured for identifying facial characteristics of persons imaged in the digital image data.

18. The system of claim 16, wherein the application is further configured for serving a plurality of distinctive markers configured for printing on remote printers for providing distinctive marking signs for placing with subject matter to be photographed to create the digital image data.

19. The system of claim 18, wherein the application is further configured for identifying the distinctive markers when present in the digital image data.

20. The system of claim 16, wherein the application is further configured for searching the database using at least one object description included in the assigned descriptions specifying a personal identifying characteristic.

21. A computer-implemented method, comprising:
analyzing digital image data associated with a plurality of photographic images to identify feature information present in respective photographic images;
providing the digital image data for storage in a data structure in association with the respective identified feature information;
receiving requests to access the digital image data, wherein the requests comprise search criteria corresponding to categories of the feature information;
providing responses to the requests, the responses comprising identifiers for discrete photographic images in the data structure at least partially matching the search criteria.

22. The method of claim 21, wherein the feature information comprises facial characteristics of persons imaged in the digital image data.

23. The method of claim 22, wherein the search criteria comprises facial characteristics of users associated with the requests.

24. The method of claim 21, further comprising collecting source information for each image file included in the digital image data.

25. The method of claim 24, wherein the source information comprises a time and a location that each image file was first generated.

26. The method of claim 21, further comprising querying the data structure to identify the discrete photographic images.

27. The method of claim 21, further comprising distributing a plurality of distinctive markers to contributors of the digital image data.

28. The method of claim 27, wherein the analyzing step further comprises identifying the distinctive markers when present in the plurality of photographic images.

29. The method of claim 28, wherein the receiving requests step further comprises receiving search criteria specifying selected ones of the distinctive markers.

30. The method of claim 21, wherein the receiving requests step further comprises receiving search criteria specifying a specific public event occurring at a specified date and location.

31. A system, comprising:
a server having a memory holding an application, wherein the application is configured to:

analyze digital image data associated with a plurality of photographic images to identify feature information present in respective photographic images;

provide the digital image data for storage in a data storage in association with the respective identified feature information;

receive requests to access the digital image data, wherein the requests comprise search criteria corresponding to categories of the feature information;

provide responses to the requests, the responses comprising identifiers for discrete photographic images in the data storage at least partially matching the search criteria.

32. The system of claim 31, wherein the application is further configured for identifying facial characteristics of persons imaged in the digital image data.

33. The system of claim 31, wherein the search criteria comprises facial characteristics of users associated with the requests.

34. The system of claim 31, wherein the application is further configured for serving a plurality of distinctive markers configured for printing on remote printers for providing distinctive marking signs for placing with subject matter to be photographed to create the digital image data.

35. The system of claim 34, wherein the application is further configured for identifying the distinctive markers when present in the digital image data.

36. An article of manufacture including a computer-readable medium having instructions stored thereon that, if executed by a computing system, cause the computing system to perform operations comprising:

collecting digital image data comprising a plurality of discrete photographic images in digital form;

collecting source information for each of the plurality of discrete photographic images;

analyzing the digital image data to assign descriptions of objects appearing in each of the plurality of discrete photographic images;

providing the digital image data for storage in a data storage in association with the source information and the assigned descriptions of objects appearing in the images;

receiving requests to search the digital image data, wherein the requests comprise search criteria specifying descriptions of objects; and serving responses to the requests, the responses comprising identifiers for discrete photographic images in the database at least partially matching the search criteria.

37. The article of manufacture of claim 36, wherein the operations further comprise identifying facial characteristics of persons imaged in the digital image data.

38. The article of manufacture of claim 36, wherein the operations further comprise serving a plurality of distinctive markers configured for printing on remote printers for providing distinctive marking signs for placing with subject matter to be photographed to create the digital image data.

39. The article of manufacture of claim 38, wherein the operations further comprise identifying the distinctive markers when present in the digital image data.

40. Article of manufacture of claim 36, wherein the operations further comprise searching the data storage using at least one object description included in the assigned descriptions specifying a personal identifying characteristic, to locate the at least one image file in the digital image data.

41. An article of manufacture including a computer-readable medium having instructions stored thereon that, if executed by a computing system, cause the computing system to perform operations comprising:

analyzing digital image data associated with a plurality of photographic images to identify feature information present in respective photographic images;

providing the digital image data for storage in a data structure in association with the respective identified feature information;

receiving requests to access the digital image data, wherein the requests comprise search criteria corresponding to categories of the feature information;

providing responses to the requests, the responses comprising identifiers for discrete photographic images in the data structure at least partially matching the search criteria.

42. The article of manufacture of claim 36, wherein the operations further comprise identifying facial characteristics of persons imaged in the digital image data.

43. The article of manufacture of claim 36, wherein the search criteria comprises facial characteristics of users associated with the requests.

44. The article of manufacture of claim 36, wherein the operations further comprise serving a plurality of distinctive markers configured for printing on remote printers for providing distinctive marking signs for placing with subject matter to be photographed to create the digital image data.

45. The article of manufacture of claim 44, wherein the operations further comprise identifying the distinctive markers when present in the digital image data.

* * * * *

UNITED STATES PATENT AND TRADEMARK OFFICE
CERTIFICATE OF CORRECTION

| | | |
|---|---|---|
| PATENT NO. | : 7,844,141 B2 | Page 1 of 1 |
| APPLICATION NO. | : 12/325589 | |
| DATED | : November 30, 2010 | |
| INVENTOR(S) | : Shuster | |

It is certified that error appears in the above-identified patent and that said Letters Patent is hereby corrected as shown below:

Title page, item (56), under "U.S. Patent Documents" in Column 2, Line 10, delete "7,110,996 B2 9/2006 Kawamura" and insert -- 7,110,996 B2 * 9/2006 Kawamura ......1/1 --.

Title page, item (57), under "Abstract" in Column 2, Line 12, delete "requesters," and insert -- requestors, --.

Column 3, line 14, delete "ways" and insert -- way, --.

Column 5, line 20, in Claim 8, before "further" delete "wherein".

Column 8, line 12, in Claim 40, delete "Article" and insert -- The article --.

Signed and Sealed this
Twenty-fourth Day of May, 2011

David J. Kappos
*Director of the United States Patent and Trademark Office*